United States Patent
Jaynes et al.

(10) Patent No.: US 8,786,788 B2
(45) Date of Patent: Jul. 22, 2014

(54) SYSTEM AND METHOD FOR IMAGE ASPECT PRESERVATION IN MULTIPLE PROJECTOR ALIGNMENT

(71) Applicant: Mersive Technologies, Inc., Denver, CO (US)

(72) Inventors: Christopher O. Jaynes, Denver, CO (US); Russell Huonder, Windsor, CO (US)

(73) Assignee: Mersive Technologies, Inc., Denver, CO (US)

( * ) Notice: Subject to any disclaimer, the term of this patent is extended or adjusted under 35 U.S.C. 154(b) by 0 days.

(21) Appl. No.: 13/866,659

(22) Filed: Apr. 19, 2013

(65) Prior Publication Data

US 2013/0278840 A1    Oct. 24, 2013

Related U.S. Application Data

(60) Provisional application No. 61/636,318, filed on Apr. 20, 2012.

(51) Int. Cl.
H04N 3/223    (2006.01)
H04N 3/227    (2006.01)

(52) U.S. Cl.
USPC ............................ 348/747; 348/744; 348/383

(58) Field of Classification Search
USPC ......... 348/747, 744, 745, 383, 580, 511, 806, 348/840, 750, 751, 756; 345/1.1, 1.3, 63, 345/589, 639, 647
IPC .............................................. H04N 3/223,3/227
See application file for complete search history.

(56) References Cited

U.S. PATENT DOCUMENTS 5,771,072 A * 6/1998 Tokoro et al. .................. 348/383
6,695,451 B1 * 2/2004 Yamasaki et al. ............... 353/30
7,292,207 B1 * 11/2007 Naegle et al. .................. 345/1.3

* cited by examiner

Primary Examiner — Trang U Tran
(74) Attorney, Agent, or Firm — Lathrop & Gage LLP

(57) ABSTRACT

A method is disclosed herein that derives a post-alignment transform that is applied to the input source after the application of an alignment transform to ensure that when each source illuminates the screen, the display is aligned and retains the correct displayed aspect ratio. The transform takes into account the alignment transform and the input source aspect, and then performs a secondary, post-processing transformation that corrects the distortion induced by the alignment transform. This aspect-preserving function is a linear transform that maps pixels in the aligned space to the aligned and aspect-correct space and can be applied to the input signal after the first alignment transform, or, in the case where the alignment transform is also linear, transforms can be directly combined to derive a compound multi-projector, aspect preserving transform. In this way, the input signal to the projectors will be aligned as well as retain proper aspect.

1 Claim, 5 Drawing Sheets

SYSTEM AND METHOD FOR IMAGE ASPECT PRESERVATION IN MULTIPLE PROJECTOR ALIGNMENT

RELATED APPLICATIONS

This Application is claims the benefit of U.S. application Ser. No. 61/636,318 filed Apr. 20, 2012 and is incorporated by reference herein.

BACKGROUND AND STATEMENT OF THE PROBLEM

Multi-projector display systems have become increasingly popular when large-scale, high resolution displays are required. Overlapping projectors to combine the resolution, brightness and size of several projectors into a single display is a well-known method for achieving these goals. Because each of the projectors will have its own geometric position, brightness, color response, and distortion, it is important that the image output by each projector is transformed into a common space to ensure that the individual images combine into a seamless image on the display surface. In order to achieve this, post-processing alignment step is applied to the video signal at each projector. FIG. 1, which is a diagram of an exemplary multiple projector system that can be aligned by the present method, depicts the situation wherein:

Aspect ratio $A_{3xL} = (wS1 + wS2 + wS3)/h$ $Iw = w1 + w2 + w3 = (a-G+G-H+H-f)$ $Ih = h$ As shown in FIG. 1, input video sources Ik 103(1)-103(3) are input into an array of video projectors Pk 104 (three projectors P1-P3 are shown) that illuminate a respective surface 105(1)-105(3) whose resulting images Sk 107(1)-107(3) are distorted by the display surface shape, the configuration of the projectors and other factors. The aspect ratio of each input source is h/w and the total aspect ratio of the input image display is defined by each of the input aspect ratios and their configuration. This input size and aspect ratio is simply the combination of each input signal and how those signals are logically configured into an input array. For example, a computer that contains a graphics subsystem with three outputs may be configured into a in a 3×1 configuration as shown to support a wide computer desktop application. The resulting aspect, then, is the sum of the widths SI1 (a-c in FIG. 1)+SI2+SI3.

The goal of multi-projector alignment is to re-map the input images so that when they reach the projector and illuminate the display, they create a seamless image on the screen surface. However, when the input images are geometrically distorted by the alignment process, the aspect ratio of the input source is not typically retained. The goal of alignment has been viewed as independent of both alignment and preserving input image aspect. A proper post-processing step is required to compute an alignment transform that remaps input pixels from each of the source images $I_1$-$I_k$ to an output image that will be aligned physically on the displays surface when the SI1 ... k images are combined but also preserves the input aspect ratio of the display system.

This is a significant problem because the change in effective aspect ratio, in particular, for projector displays that are dynamically reconfigured or are constructed in an ad hoc manner can lead to significant changes in the display's effective aspect ratio. In FIG. 1, for example a 1×3 array of projectors yields an aspect ratio that is three times the input width by the height of the input. When the projectors are overlapped to create a 1×3 overlapped array of projected images with horizontal overlap only, pixels are effectively "lost" in the overlap zones and impact the display width significantly, while loss of pixels in the vertical direction may be less. This type of alignment transform does not reserve the input aspect of the image and can result in unwanted distortions.

Take, for example, the case when a three-projector system is being driven by three WUXA input signals whose source resolution is 1920×1200 (w=1920, h=1200). If the input signals are configured to be a three-wide-one-high configuration (e.g., a wide screen desktop computer), the resulting aspect ratio is: 5760/1200 or 4.8. When these outputs are used to drive a multi-projector array that is overlapped and then calibrated, the data is remapped into a virtual window whose effective resolution is somewhat less than that of the input source. This new virtual display has a width and height that is determined both by the geometric transform that aligns the input images as well as other constraints including determination of the viewable area (i.e. specification of a rectangular region to which the input video must be mapped). This pixel loss is related to the degree to which the projectors are overlapped, skew on the screen of the projected image, and other factors.

In the previous 1×3 example, there is no overlap between projected images a-G, G-H, and H-f. If it is now, in a second example, assumed that all the vertical 1200 pixels in each projector are retained projected to the screen surface but 10% of the pixels in the horizontal area between the projected displays are lost due to overlap of the adjacent images, then the result is a new aspect ratio of: (5760*0.9)/1200, or 4.32, as indicated by overlapping displays a-c, b-e, and d-f [compare this new aspect ratio with the previous value of 4.8]. Thus, in effect, the alignment transform induces a geometric distortion in all cases except where the lost pixels in the overlapping region exactly match in both the vertical and horizontal directions. However, this is almost never the case. There has been no previous solution that addresses the above problem with aligned projector displays.

SUMMARY

A method is disclosed that derives a post-alignment transform which is applied to the input source after the application of an alignment transform to ensure that when each source of a multiple-display system illuminates the screen, the display is aligned and retains the correct displayed aspect ratio. The post-alignment transform takes into account the alignment transform and the input source aspect, and then performs a secondary, post-processing transformation that corrects the distortion induced by the alignment transform. This aspect-preserving function is a linear transform that maps pixels in the aligned space to the aligned and aspect-correct space and which can be applied to the input signal after the first alignment transform, or, in the case where the alignment transform is also linear, transforms can be directly combined to derive a compound multi-projector, aspect preserving transform. In this way, the input signal to the projectors will be aligned as well as retain proper aspect.

DETAILED DESCRIPTION

Figure 1:
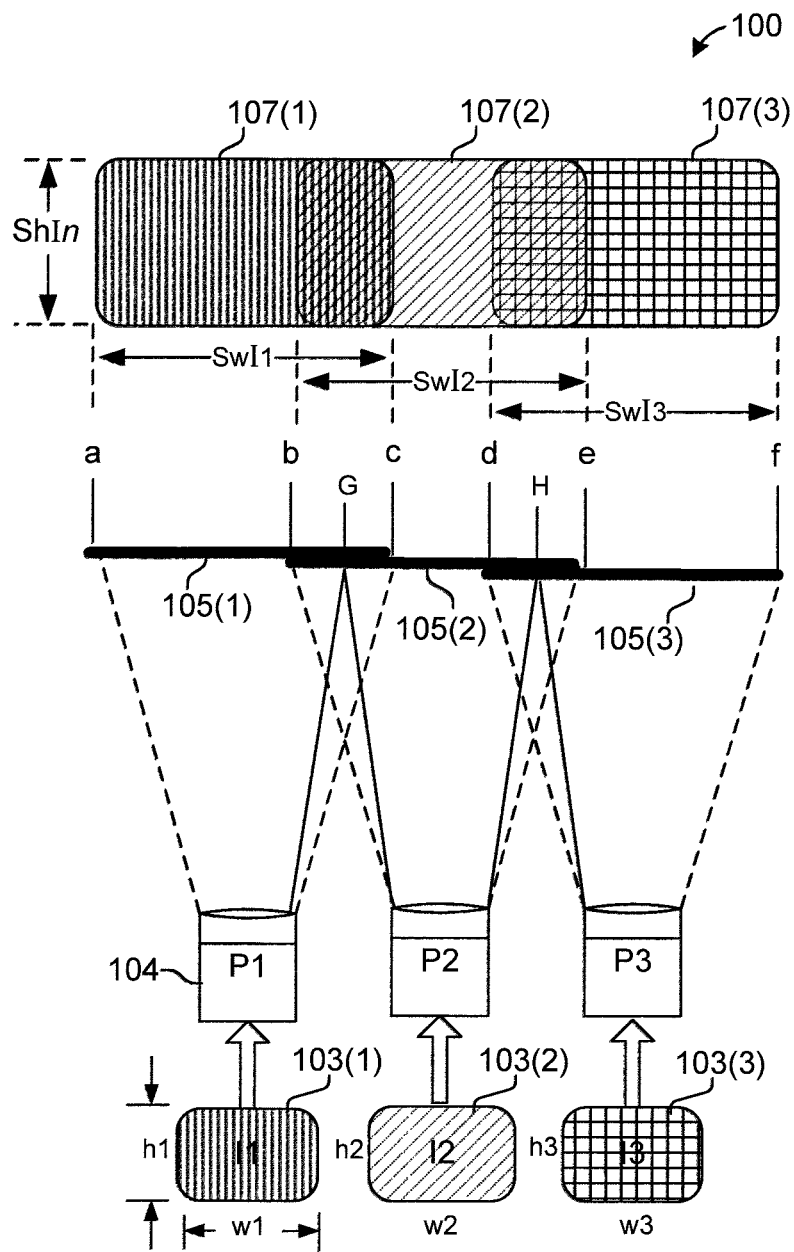
FIG. 1 is a diagram of an exemplary multiple projector system.
Figure 2:
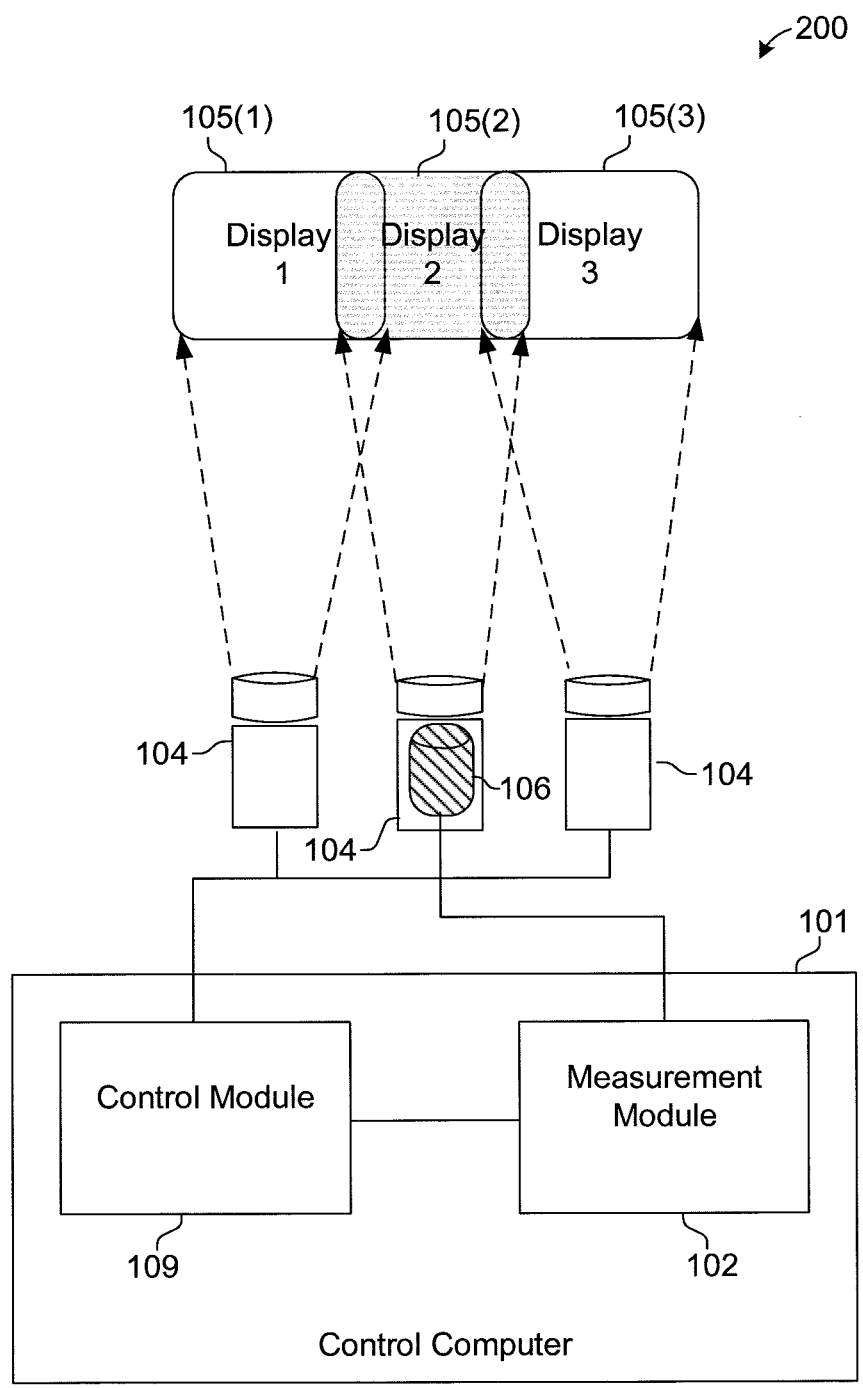
FIG. 2 is an exemplary diagram of one embodiment of the present system.
Figure 3:
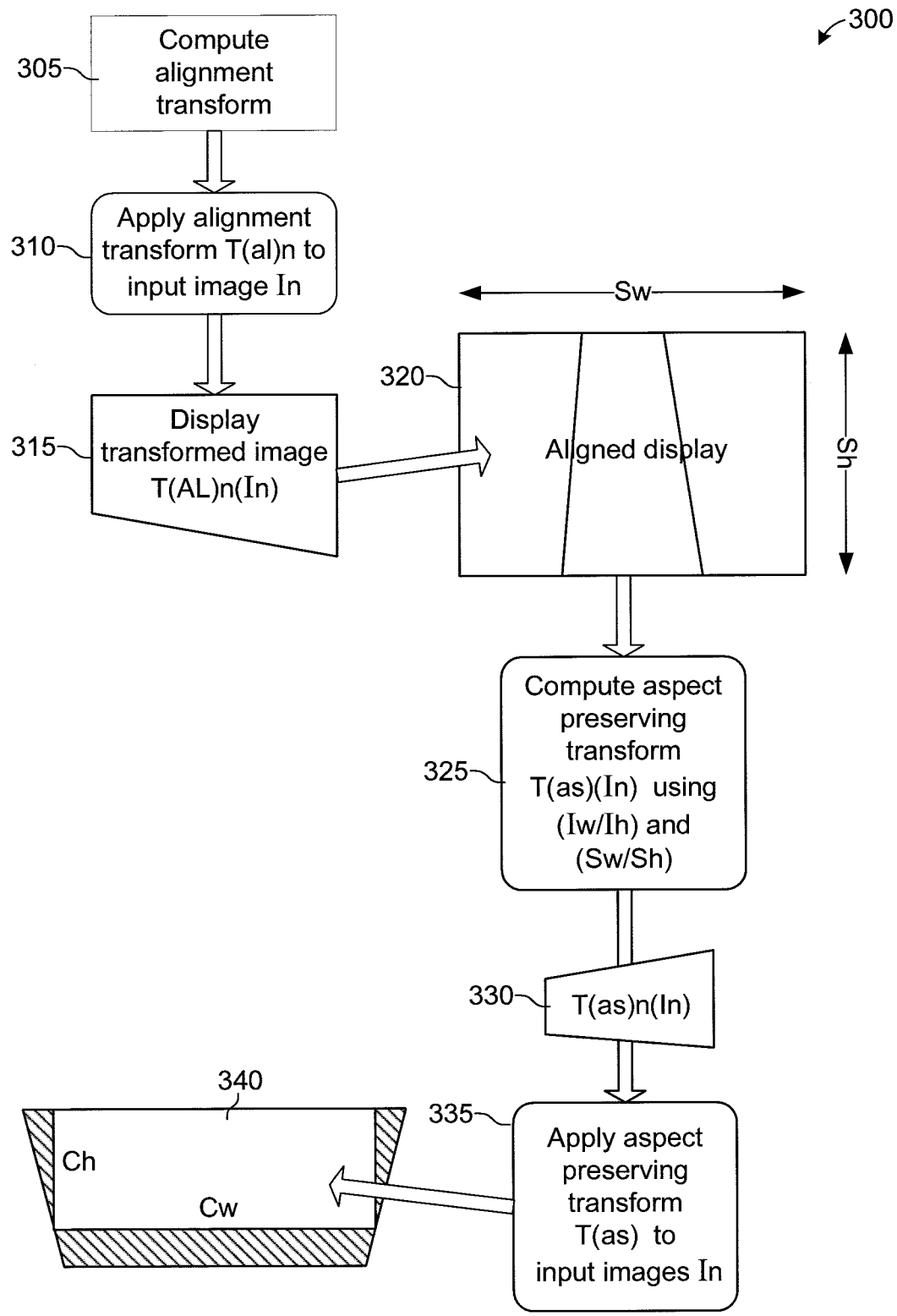
FIG. 3 shows an exemplary processing pipeline in one embodiment of the present system.

FIG. 2 is a diagram of one exemplary embodiment 200 of the present system, and FIG. 3 shows an exemplary processing pipeline 300 in one embodiment of the present system. Although FIGS. 1 and 2, and subsequent examples herein address a three-projector system, it should be understood that the present system and method is operable with any practicable number and arrangement of projectors Pn [reference no. 104].

As shown in FIGS. 1-3, initially, at step 310, each of the constituent input images I1, I2, I3, is first passed through an alignment transform T(al)n that aligns those images onto respective parts of display surface 105(1-3). The total displayable width and height, including the overlapped area, of those constituent images Sh(I) and Sw(I) is then determined. These values can be determined through a user feedback mechanism, or automatically derived using the information contained in the alignment transform data. For example, a user may interactively specify a rectangular region on the aligned display into which they want to map the resulting data. This rectangle's width and height can then be measured and used to derive a screen surface aspect ratio that is provided to the system.

Alternatively, as described further below, the largest enclosing rectangle (bounding region) contained in the aligned display surface can be derived. The relative width and height of this rectangle can be derived through well-known projective geometry methods and an estimated screen surface aspect ratio is computed. A hardware arrangement 200 such as that shown in FIG. 2 can be used to measure displayed screen shapes and to measure values for display heights and widths Sh and Sw. Measurements may be made using a control computer 101 including camera 106 coupled to a measurement module 102. Control of projectors 104 is provided by control module 109, which includes the computer software required for executing the various transforms and related operations described herein.

As previously noted, the input aspect ratio IA=(Iw/Ih) will not normally be the same as the screen surface aspect SA= (Sw/Sh). Therefore, a transformation is computed that maps image content to a final display mapping whose aspect matches that of the input aspect (to avoid image distortions) and which, after a correction factor C is applied, has a corrected width and height of Cw, Ch, respectively. This linear transform T is typically a 2D scale transform in both the X/Y directions as well as a 2D translation and is applied in sequence with the input distortion so that the content is aligned and so that IA=CA.

Below is an example for a single projector (P1 in FIG. 1) with sample data shown in brackets:

$$SA = \frac{Sw\ [3.0]}{Sh\ [2.0]}\ (\text{in FIG. 1}, Sw(I1) = a\text{-}c)$$

$$IA = \frac{Iw\ [4.0]}{Ih\ [2.0]}$$

$$C = \frac{Sw/Iw}{Sh/Ih} = \frac{[3.0]/[4.0]}{2.0/2.0} = \frac{0.75}{1} \begin{array}{l} = \text{horizontal correction} \\ = \text{vertical correction} \end{array}$$

$IA = CA$, where $Cw = 0.75$ w, and $Ch = 1$ h

This correcting aspect ratio, CA, is then used to derive a target transform T that maps the transformed images to a new image space that contains that aspect ratio of the input space. For example, a 2D scale transform can map the 2D transformed images to a scaled space in which the sum of each of the transformed images results in a new output image that is aspect correct.

FIG. 3 shows an exemplary processing pipeline 300 in one embodiment of the present system. Initially, an alignment transform Tal is computed at step 305, and at step 310, applied to each input image In, which is displayed at step 315, to generate the resulting aligned display 320 with width Sw and height Sh. Display 320 is then analyzed at step 325 to determine an aspect-preserving transform Tas 330, that is applied to the input image data at step 335 to generate an aspect-corrected display 340.

It may be difficult to estimate the resulting aspect ratio of the displayed image. If the projectors are illuminating a curved surface, overlap in partial and complex ways, and are protectively distorted—it may be unclear what the screen surface aspect may be. Two methods are disclosed herein, which respectively address this problem by means of:

1) user-supplied target values Sh and Sw, or
2) an automatically derived Sh and Sw that is computed from the alignment transforms T al and T as themselves.

Figure 4:
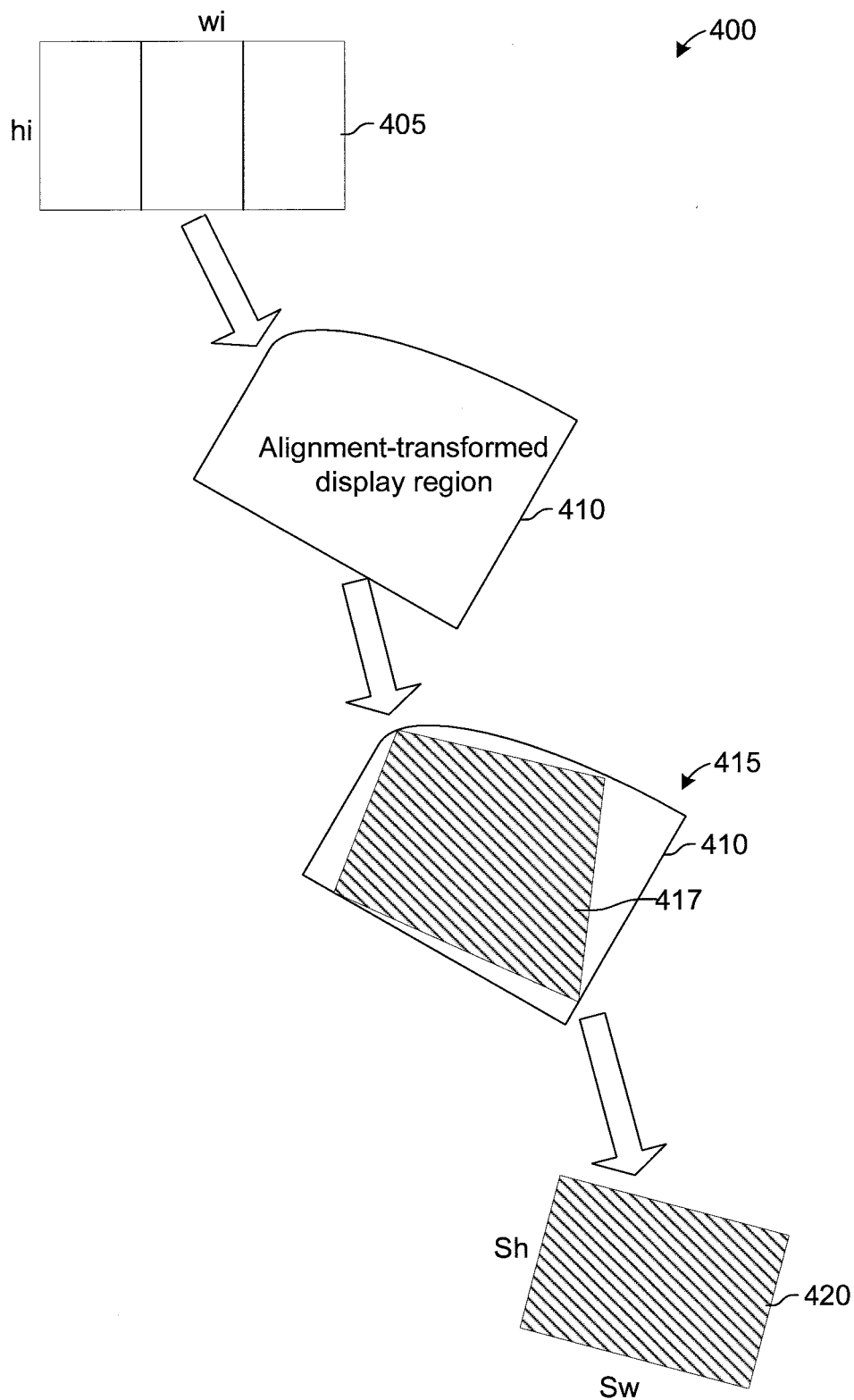
FIG. 4 is depicts an exemplary method for determining Sh and Sw values in one embodiment of the present method.
Figure 5:
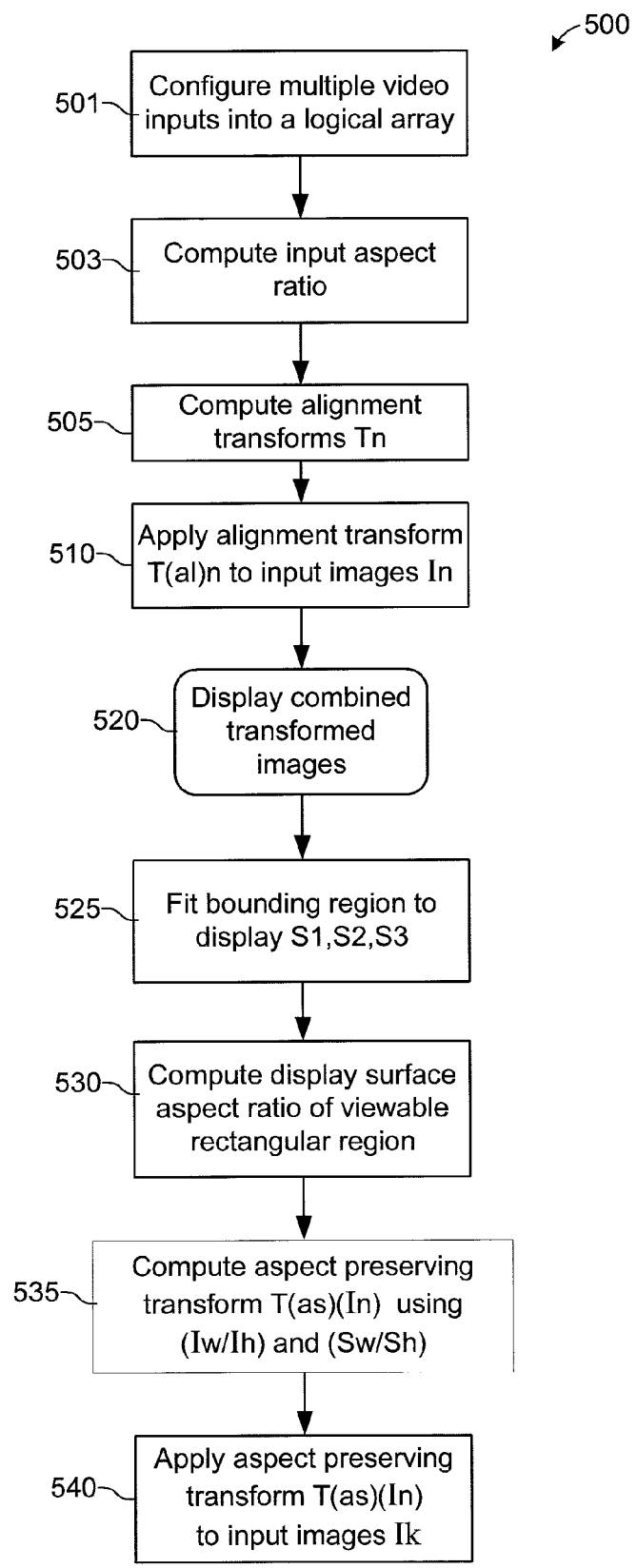
FIG. 5 is a flowchart showing an exemplary set of steps performed in one embodiment of the present method.

FIG. 4 depicts an exemplary method 400 for determining real-world Sh and Sw values by analyzing the aligned display surface alone. FIG. 5 is a flowchart showing an exemplary set of steps performed in one embodiment of the present method. Operation of the present system is best understood by viewing FIGS. 4 and 5 in conjunction with one another.

As shown in FIGS. 4 and 5, at step 501, multiple video inputs I1-In are configured into a logical array, such as the 3×1 array shown in FIG. 1. At step 503, the input aspect ratio, IA=Iw/Ih, of the array is computed from the aspect ratios of the input sources Ik and their configuration. At step 505, an alignment transform T(al)k is calculated that maps input video signals into a seamless continuous image on display surface 405, as is known in the art. Optionally, a set of transforms may be derived that map the display surface pixels to pixels as captured by camera 106.

In the case when a user is supplying the Sh and Sw values, a user can provide values that reflect the physically visible area or an aspect ratio that was measured on the screen. A user-interface module reads these values and then uses them to derive the aspect ratio preserving transform.

In the case where Sh and Sw values are automatically derived by the present method, a bounding region 417 is fit to the measured alignment mappings, Tk. Each of the warped images, Tk(Ik) [T being the alignment transform that maps each projector to an aligned screen space that did not necessarily preserve aspect] are added together to form a resulting addressable space of 2D values. This space defines the extents of the display and may take almost any arbitrary shape, such as for example, where the projectors are illuminating a curved display surface.

FIG. 4 shows how the input images of a system may be mapped to a 2D display region that is distorted. As shown in FIGS. 4 and 5, at step 510, an input image array 405 with its own aspect ratio wi/hi is transformed into a differently shaped display region 410 after the above alignment transforms have been applied, and at step 520, the combined transformed images are displayed:

$$Tk \times Iw(k)/Ih(k)=Sw/Sh.$$

At step 525, this new shape is the set of pixels that can be addressed after fitting a polygonal bounding region 417 to the display 410 in which a new display frame is defined, as shown by arrow 415. However, this display frame is potentially still perspectively distorted based on how the alignment transform was computed and applied. For example, in the case when a camera was used to align the projector array the position of the camera may include a perspective distortion to the bounding region 417. This polygonal bounding region 417 is then transformed into a rectangle 420 to automatically derive values for Sh and Sw. One approach to deriving rectangle 420 from the observed polygonal projective geometry is described below.

Because the alignment transform maps 2D input pixel locations to their position on the 3D display surface, there is a known relationship between the 2D camera and the display surface. There is a known pixel-wise relationship between each 3D line segment of the bounding polygon and the 2D image line. If we suppose that a 3D line L on the display surface is given as the set:

$$L = \left\{ \begin{pmatrix} x \\ y \\ z \end{pmatrix} \middle| \text{ for some } \lambda, \begin{pmatrix} x \\ y \\ z \end{pmatrix} = \begin{pmatrix} a_1 \\ a_2 \\ a_3 \end{pmatrix} + \lambda \begin{bmatrix} b_1 \\ b_2 \\ b_3 \end{bmatrix} \right\}$$

and its corresponding 2D line is the perspective projection of L written as:

$$M = \left\{ \begin{pmatrix} u \\ v \end{pmatrix} \middle| \text{ for some } \eta, \begin{pmatrix} u \\ v \end{pmatrix} = \begin{pmatrix} c_1 \\ c_2 \end{pmatrix} + \eta \begin{bmatrix} d_1 \\ d_2 \end{bmatrix} \right\}$$

If it is assumed that the camera lens is the origin of the coordinate system the well-known perspective transform relates the 3D line locations to 2D image positions as:

$$u = f\frac{x}{z}$$
$$v = f\frac{y}{z}$$

where f is the focal length of the camera that is calibrated to the display surface. Hence, for any given $\lambda$, $\eta$ must satisfy:

$$c_1 + \eta d_1 = \frac{f(a_1 + \lambda b_1)}{(a_3 + \lambda b_3)}$$
$$c_2 + \eta d_2 = \frac{f(a_2 + \lambda b_2)}{(a_3 + \lambda b_3)}$$

Given these constraints, it is possible to derive two equations that relate parameters $d_1$, $d_2$, $c_1$, and $c_2$ of the perspectively transformed line on the camera plane with the unknown parameters $a_1$, $a_2$, $a_3$, $b_1$, $b_2$, and $b_3$ that describe the 3D line segment as follows:

$$d_2 f a_1 - d_1 f a_2 + (c_2 d_1 - c_1 d_2)a_3 = 0$$

$$d_2 f b_1 - d_1 f b_2 + (c_2 d_1 - c_1 d_2)b_3 = 0$$

This yields two constraints on the unknown six parameters of the 3D line segment. However, an additional constraint is implied by the parameterization of the line segment $$b_1^2 + b_2^2 + b_3^2 = 1$$

Finally, an additional constraint that makes the 3D point $a_1$, $a_2$, $a_3$ (through which the line passes) unique is possible by requiring that the vector from the origin to it is perpendicular. In this case:

$$a_1 b_1 + a_2 b_2 + a_3 b_3 = 1$$

The above-described process yields four of the six constraints that are required to determine the 3D line segment from its perspective projection. Finally, we assume that the 3D line segments in question represent a rectangle in the 3D display surface space. This means that the 3D line segments are perpendicular. In fact, one edge segment of the rectangle will be perpendicular to the other two lines that it intersects. In this case, the two lines that it intersects have the same direction cosines and it is possible to derive an additional two constraints that relate the 2D line segments in the camera space to that of the screen space. These 3D line segments are used to compute Sh and Sw values that yield the screen aspect ratio prior to it being corrected. As previously described, a correcting transform is then computed that reconciles the difference between screen aspect and the input aspect.

There is no unique solution to computing the aspect preserving transform. A variety of 2D transforms will map the transformed images into an output space whose aspect is correct (i.e., any scale multiple of the correct aspect ratio). For example, any integer scale multiple of a correct aspect ratio will yield the same aspect ratio but may be undesirable to the user. Imagine a case where the derived aspect is 2/1. The same aspect ratio can be derived through a 2D transform that also induces an integer scale factor of 4, 4*(2/1)=8/4=2/1. However, this 2D transform will result in an image that is 4 times larger.

Therefore, external constraints must be used to determine a single transform that preserves aspect. Example constraints are largest viewable area or the minimum distortion of the video content from the input source. In practice a user can select between these constraints to yield different mappings that still preserve aspect. Example choices include "Stretch"—ignore source aspect ratio and the aspect preserving transform becomes identity, "Fit"—when all pixels in the largest dimension of the bounding region are used but the resulting image aspect is preserved and "Fill"—where the smallest axis of the bounding region is filled, aspect is preserved but in order to do so the input content may be outside the viewable bounding region.

At step 530, the display surface aspect ratio of the viewable rectangular region, e.g., 105(1)+105(2)+105(3), is computed. At step 535, an aspect preserving transform T(as)(In) is computed using (Iw/Ih) and (Sw/Sh), and the transform is applied to input images Ik to generate aligned image 420 having a properly preserved aspect ratio.

Certain changes may be made in the above methods and systems without departing from the scope of that which is described herein. It is to be noted that all matter contained in the above description or shown in the accompanying drawings is to be interpreted as illustrative and not in a limiting sense. The elements and steps shown in the present drawings may be modified in accordance with the methods described herein, and the steps shown therein may be sequenced in other configurations without departing from the spirit of the system thus described.

What is claimed is:

1. A method for preserving aspect ratio in a system using a plurality of projectors arranged in a configuration for displaying overlapping images on a display surface comprising:
- determining an input aspect ratio of the configuration;
- using an alignment transform to map video signals input to the plurality of projectors into a partially overlapping continuous image on the display surface;
- computing a displayed aspect ratio of the image on a viewable rectangular region on the display surface;
- computing an aspect preserving transform using the input aspect ratio and the displayed aspect ratio of the image; and
- applying the transform to the video signals input to the projectors.

* * * * *